United States Patent
Mohan et al.

(10) Patent No.: US 8,366,003 B2
(45) Date of Patent: Feb. 5, 2013

(54) METHODS AND APPARATUS FOR BOKEH CODES

(75) Inventors: Ankit Mohan, Cambridge, MA (US); Ramesh Raskar, Cambridge, MA (US); Shinsaku Hiura, Hyogo (JP); Quinn Smithwick, Cambridge, MA (US); Grace Woo, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 98 days.

(21) Appl. No.: 12/838,304

(22) Filed: Jul. 16, 2010

(65) Prior Publication Data

US 2011/0017826 A1  Jan. 27, 2011

Related U.S. Application Data

(60) Provisional application No. 61/228,110, filed on Jul. 23, 2009.

(51) Int. Cl.
*G06K 7/10* (2006.01)

(52) U.S. Cl. ......... 235/462.11; 235/462.01; 235/462.05; 235/462.09; 235/487

(58) Field of Classification Search ................... 235/454, 235/462.01, 462.05, 462.06, 462.09, 462.11, 235/462.22, 462.41, 487, 491, 494, 495, 235/486

See application file for complete search history.

(56) References Cited

U.S. PATENT DOCUMENTS

| | | | |
|---|---|---|---|
| 4,869,946 A * | 9/1989 | Clay | 428/167 |
| 5,196,683 A * | 3/1993 | Marom et al. | 235/462.01 |
| 5,731,883 A * | 3/1998 | Morton et al. | 358/451 |
| 6,208,468 B1 * | 3/2001 | Togino et al. | 359/637 |
| 6,540,145 B2 * | 4/2003 | Gurevich et al. | 235/462.21 |
| 6,974,080 B1 * | 12/2005 | Goggins | 235/462.01 |
| 7,212,353 B2 * | 5/2007 | Sunaga | 359/726 |
| 7,571,856 B2 * | 8/2009 | Lo | 235/462.01 |
| 7,638,095 B2 * | 12/2009 | Sabol | 422/68.1 |
| 2007/0100222 A1 * | 5/2007 | Mastrototaro et al. | 600/365 |
| 2007/0189928 A1 * | 8/2007 | Sabol | 422/82.03 |
| 2009/0212109 A1 * | 8/2009 | Harttig et al. | 235/454 |

\* cited by examiner

*Primary Examiner* — Daniel Hess
*Assistant Examiner* — Paultep Savusdiphol
(74) *Attorney, Agent, or Firm* — Stephen R. Otis

(57) ABSTRACT

In an illustrative implementation of this invention, an optical pattern that encodes binary data is printed on a transparency. For example, the pattern may comprise data matrix codes. A lenslet is placed at a distance equal to its focal length from the optical pattern, and thus collimates light from the optical pattern. The collimated light travels to a conventional camera. For example, the camera may be meters distant. The camera takes a photograph of the optical pattern at a time that the camera is not focused on the scene that it is imaging, but instead is focused at infinity. Because the light is collimated, however, a focused image is captured at the camera's focal plane. The binary data in the pattern may include information regarding the object to which the optical pattern is affixed and information from which the camera's pose may be calculated.

27 Claims, 9 Drawing Sheets

METHODS AND APPARATUS FOR BOKEH CODES

CROSS-REFERENCE TO RELATED APPLICATION

This application is a non-provisional of, and claims the benefit of, U.S. Provisional Patent Application Ser. No. 61/228,110 filed on Jul. 23, 2009, the entire disclosure of which is incorporated by reference herein.

FIELD OF THE INVENTION

This invention relates generally to bar codes.

BACKGROUND OF THE INVENTION

Conventional barcodes are large in size compared to the amount of information that they contain, and can typically be read only by specialized devices in close proximity to the barcode.

SUMMARY OF THE INVENTION

It is would be highly desirable if a printed optical pattern would (a) provide more information than a conventional barcode, (b) be smaller than a conventional barcode, (c) be readable at a greater distance than a conventional barcode, (d) be readable by a wide variety of devices, including a standard camera, and (e) provide information that would allow the relative position, angle and distance of the camera to be determined. This invention may be implemented in such a manner as to achieve these desired goals.

According to the principles of this invention, a printed optical pattern may encode binary data, and may be used in a manner that exploits the bokeh effect in optics. The bokeh effect occurs when a photograph is taken by a taken by a camera that is "out-of-focus"—i.e., not focused on the scene it is imaging. A point in a scene, photographed by a typical camera when it is out-of-focus, forms a defocus blur, or bokeh, on the camera's sensor. If light from the point is diffuse, all the rays from the point have roughly the same radiance, so the bokeh takes the shape of the camera's aperture. For example, in a typical camera with a round aperture, the bokeh is disc-shaped and is called the circle of confusion.

In an illustrative implementation of this invention, an optical pattern that encodes binary data is printed on a transparency. For example, the pattern may comprise an array of data matrix codes. A lenslet is placed at a distance equal to its focal length from the optical pattern, and thus collimates light from the optical pattern. The collimated light travels to a conventional camera. For example, the camera may be meters distant. The camera takes a photograph of the optical pattern at a time that the camera is not focused on the scene that it is imaging, but instead is focused at infinity. Because the light is collimated, however, a focused image is captured at the camera's focal plane. The binary data in the pattern may include a wide variety of information, such as information regarding the object to which the optical pattern is affixed or information from which the camera's pose may be calculated.

In an illustrative implementation of this invention, the lenslet creates directionally varying light rays. The binary data that is printed in the spatial domain on the transparency becomes encoded in the angular variation of these light rays. These angularly varying light rays travel to a standard camera. The camera images the bokode pattern while out-of-focus, transforming this angular encoding into the spatial domain of the image in the sensor plane.

As used herein, "bokode pattern" means an optical pattern indicative of binary data. A "bokode" refers to apparatus comprising a bokode pattern, a device (such as one or more lenses) for altering the direction of light from the bokode pattern and a housing. For example, a bokode may be very small, and may be comprised of a bokode pattern and a lenslet inside an acrylic housing.

In an illustrative implementation of this invention, the lenslet has a small diameter (3 mm) and short focal length (8 mm) and is placed at a distance equal to its focal length (8 mm) from the bokode pattern. In this example, the bokode pattern and lenslet are so small that they are barely perceptible to a human viewer. The camera may be 0 to 5 meters away from the bokode. In this example, the imaged bokeh may be hundreds of pixels wide in diameter and may be magnified allowing thousands of bits to be decoded. The printed codes may appear as tiny dots to the human eye but appear as clearly visible codes to the out of focus camera. Features as small as 2.5 μm may be observed using the bokode and camera in this example.

In an illustrative implementation of this invention, the lenslet is placed over the printed optical pattern. The lenslet alters the direction of the light from that optical pattern in such a way that a standard camera that is out-of-focus may be used to capture a focused image of the optical pattern. Due to the lenslet, the bokeh image that is captured by the camera (which may be meters away) is not a defocused blur, but is rather a focused image of the optical pattern. Advantageously, this invention may be implemented so that the captured image is highly magnified.

This invention may be implemented in such a manner that the lenslet collimates light. The camera is focused at infinity, rather than on the bokode pattern. However, the lenslet collimates light from the optical pattern. As a result, a focused image of the bokode pattern appears at the focal plane of the camera. Thus, the unfocused camera captures a focused image of the bokode pattern. Collimating the light has many advantages. Among other things, more of the light from the optical pattern reaches the camera, rather than diverging away from the camera. Also, if the light is collimated, then there is no need to re-focus the camera as the distance to the Bokode changes.

Alternately, this invention may be implemented so that the lenslet does not collimate the light. Instead, the lenslet alters the direction of light from the optical pattern in such a way that an out-of-focus camera captures a focused image of the optical pattern at the camera's sensor plane.

This invention has many advantages and practical applications. Here are eight examples. Depending on the particular implementation or application:

First, bokodes may be used to identify objects to which they are affixed, such as boxes in a warehouse or inventory displayed in a retail store.

Second, a bokode may have a surface area so small as to be almost imperceptible to a human viewer.

Third, tiny bokodes may be placed on objects in an environment, enabling information about such objects to be obtained from such bokodes, thereby facilitating ubiquitous computing.

Fourth, a bokode worn by a human user may enable the user's environment to respond to the user's presence, such as by altering the display on a screen.

Fifth, a single photo of a bokode may be used (a) to determine the camera's pose (in six degrees of freedom) relative to the optical axis of the bokode, and (b) to identify the bokode.

Sixth, bokodes mounted on a vehicle may enable other vehicles to determine their distance and angular position from said vehicle, and react accordingly, for example, by braking or turning aside if such data indicates a collision is imminent.

Seventh, in some implementations, bokodes mounted on objects placed on a surface may be used to determine the objects' position on that surface.

Eighth, bokodes that are held or worn by many users may be used for multi-user interaction with a camera-enabled display from a distance.

According to principles of this invention, bytes of binary data in a bokode pattern may encode the position of those bytes in the pattern. Depending on the camera's pose—that is, its position in six degrees of freedom relative to the optical axis of the bokode—different bytes are visible to the camera. Thus, the binary data in the captured image may be decoded to determine the camera's pose.

The invention may be implemented in a variety of ways. Here are some examples:

This invention may be implemented as a system comprising, in combination: (a) an optical pattern in or on an object, and (b) apparatus adapted for altering the direction of light rays from said pattern in such a way that (I) binary data encoded in the spatial domain of said pattern is encoded in angular variation of said light rays after said alteration, (II) said light rays travel to a camera, and (III) a substantially focused image of at least a part of said pattern is captured at the sensor plane of said camera at a time that said camera is not focused on said object, wherein said system is separate from and not part of a unified structure with said camera. Said apparatus for altering the direction of light may comprise at least one lens.

This invention may be implemented as a system comprising, in combination: (a) an optical pattern in or on an object, and (b) apparatus adapted for altering the direction of light rays from said pattern in such a way that (I) said light rays travel to a camera that is not focused on said object, and (II) a substantially focused image of at least a part of said pattern is captured at the sensor plane of said camera, wherein said system is separate from and not part of a unified structure with said camera. Furthermore: (1) said apparatus may be configured for collimating light from said object in such a way that said light travels to said camera for imaging of at least part of said optical pattern while said camera is focused at infinity, (2) said apparatus for altering the direction of light may comprise at least one lens, (3) said optical pattern may encode binary data, (4) said binary data may include information for error correction, (5) at least one portion of said binary data may indicate the spatial position of said portion relative to said pattern, (6) said optical pattern may comprise data matrix codes, (7) said binary data may include data regarding the position or identity of a person or thing other than said apparatus, (8) said apparatus may be adapted to be carried by a human or to be affixed to items carried or worn by said human, (9) said optical pattern may be backlit at the time said camera images said pattern, (10) at least one radio frequency identification tag may be directly or indirectly affixed, or adapted to be directly or indirectly affixed, to said object, (11) said apparatus may be affixed or adapted to be affixed to an automobile or other vehicle, (12) said object may be adapted to display said optical pattern in such a way that said pattern changes over time.

This invention may be implemented as apparatus comprising a camera adapted for capturing a substantially focused image of at least part of an optical pattern while such camera is not focused at the depth of said optical pattern, wherein: (a) said optical pattern is in or on an object, (b) said optical pattern encodes binary data, (c) light from said optical pattern passes through an optical system that alters the direction of said light before said light strikes said camera, and (d) both said object and said optical system are separate from, and not part of a unified structure with, said camera. Furthermore: (1) said camera may be adapted for imaging said optical pattern while such camera is focused substantially at infinity; (2) said camera may be adapted for outputting data indicative of said image captured by said camera, for transmission to an onboard or remote computer for decoding of said binary data, (3) said apparatus may further comprise a digital processor for decoding bytes of said binary data, which bytes encode the position of said bytes in said optical pattern, and based on the positional data so decoded, calculating the camera's pose relative to the optical axis of said optical system, (4) said camera, alone or together with at least one other camera, may be adapted for imaging a plurality of said optical patterns in or on objects worn by or affixed to a plurality of persons, (5) said apparatus may further comprise a digital processor for decoding said binary data, and outputting instructions regarding audio or visual stimuli produced by at least one transducer, in such a way that said instructions depend at least in part on said decoded data, (6) said optical system may comprise at least one lens.

This invention may implemented as a method comprising using a camera to capture a focused image of a visual pattern, wherein (a) said visual pattern is in or on an object, (b) said pattern encodes binary data, (c) an optical system alters the direction of light from said pattern before said light strikes said camera, (d) said alteration of direction causes said captured image to be focused even though said camera is not focused on said pattern at the time said image is captured, and (e) both said object and said optical system are separate from, and not part of a unified structure with, said camera. Furthermore: (1) said optical system may comprise at least one lens, and (2) said camera may be focused substantially at infinity while it images said visual pattern.

BRIEF DESCRIPTION OF THE DRAWINGS

The patent or application file contains at least one color photograph. Copies of this patent or patent application publication with color photograph(s) will be provided by the Office upon request and payment of the necessary fee.

In the detailed description which follows, reference will be made to the attached figures.

DETAILED DESCRIPTION

In an exemplary implementation of this invention, an optical pattern that encodes binary data is printed on a transparency. For example, the pattern may comprise data matrix codes. A lenslet is placed at a distance equal to its focal length from the optical pattern, and converts the spatial pattern on the transparency into an angular emitted pattern from the Bokode. The collimated light emitting from the lenslet travels to a conventional camera. For example, the camera may be meters distant. The camera takes a photograph of the optical pattern at a time that the camera is not focused on the scene that it is imaging, but instead is focused at infinity. Because the light is collimated, however, a focused image is captured at the camera's focal plane. The binary data in the pattern may include a wide variety of information, such as information regarding the object to which the optical pattern is affixed or information from which the camera's pose may be calculated.

In an exemplary implementation of this invention, the lenslet creates directionally varying light rays. The binary data that is encoded in the spatial domain becomes encoded in the angular variation of these light rays. These angularly varying light rays travel to a standard camera. The camera images the bokode pattern while out-of-focus, transforming this angular encoding into the spatial domain of the image in the sensor plane.

As used herein, "bokode pattern" means an optical pattern indicative of binary data. A "bokode" refers to apparatus comprising a bokode pattern, a device (such as one or more lenses) for altering the direction of light from the bokode pattern and a housing. For example, a bokode may be very small, and may be comprised of a bokode pattern and a lenslet inside a tiny housing.

In an exemplary implementation of this invention, the lenslet has a small diameter (3 mm) and short focal length (8 mm) and is placed at a distance equal to its focal length (8 mm) from the bokode pattern. In this example, the bokode pattern and lenslet are so small that they are barely perceptible to a human viewer. The camera may be 0 to 5 meters away from the bokode. In this example, the imaged bokeh may be hundreds of pixels wide in diameter and may be magnified allowing thousands of bits to be decoded. The printed codes may appear as tiny dots to the human eye but appear as clearly visible codes to the out of focus camera. Features as small as 2.5 µm may be observed using the bokode and camera in this example.

According to the principles of this invention, a directionally varying set of light rays may be created by placing a lenslet over a printed binary code at a distance equal to the lenslet's focal length.

Figure 1:
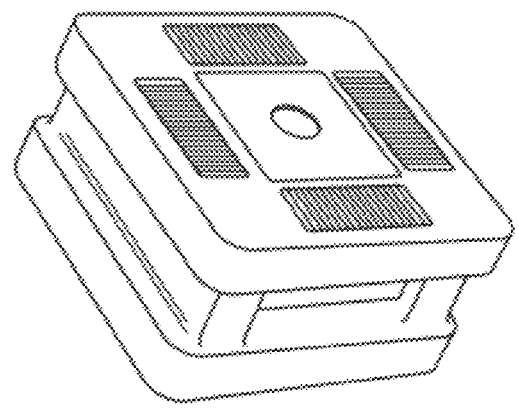
FIG. 1 is a perspective view of an exemplary implementation of this invention, which implementation is comprised of, among other things, a printed binary code and a lenslet in an acrylic housing.

FIG. 1 shows an implementation of this invention, with an acrylic housing.

Figure 2:
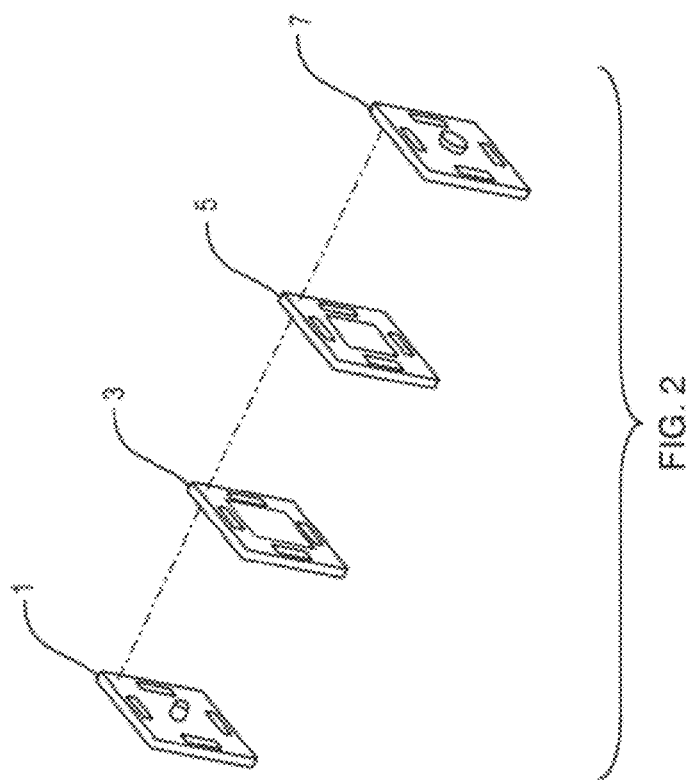
FIG. 2 is an exploded view of that implementation.

FIG. 2 is an exploded view of that implementation. In FIG. 2, a light emitting diode (LED) 1 emits light. The light is diffused by a diffuser 3. The diffused light illuminates a transparency 5 that has a printed optical pattern that encodes binary data. A lenslet 7 is placed at a distance from the transparency equal to the lenslet's focal length. The lenslet collimates the light from the transparency. Thus, light from any point on the printed binary code passes through the lenslet and is collimated when it emerges from the lenslet.

It is helpful to first consider optical factors that make detection of traditional barcodes at a distance challenging. Consider a standard camera photographing a traditional barcode, as illustrated in FIG. 3.

Figure 3:
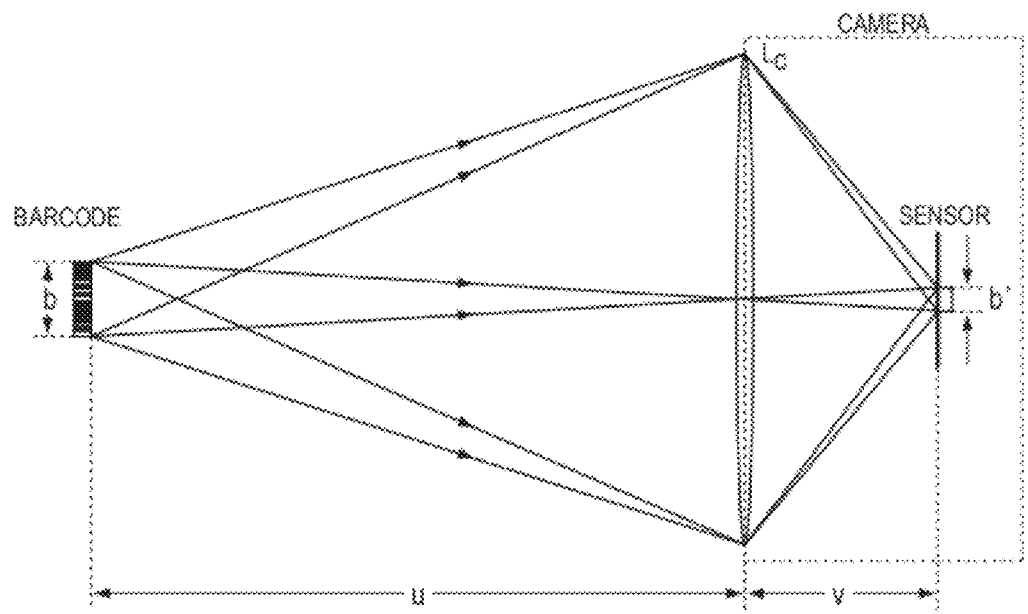
FIG. 3 is a schematic that shows a traditional camera imaging a barcode.

FIG. 3 shows a camera photographing a traditional barcode. The size of the image formed on the sensor reduces as the distance of the camera from the barcode increases. This limits the usable range for such a setup to just a few inches.

In FIG. 3, a barcode of size b is placed at a distance u from a camera lens. The lens images the barcode on the sensor at a distance v from the lens. The size of the barcode image is $b'=(v/u)b$. The effective magnification scaling is, $M_r=(b'/b)=(v/u)$. For a typical case where a 50 mm focal length lens takes a photo from about u=5 m, the focused image is at v≈50 mm and the magnification is $M_r$≈0.01. The magnification reduces as the distance of the camera from the barcode increases.

A defocus blur can be used to overcome this problem. This invention may be implemented in such a way that (a) the defocus blur provides a highly magnified image of the bokode pattern, and (b) magnification is independent of depth.

Some background on defocus blur: The defocus blur of a point light source on the image sensor is called the point spread function (PSF). The PSF of a camera depends (among other factors), on depth u of the point with respect to the camera, and the camera's plane of focus. A camera focuses by changing the distance between the lens and the image sensor. When the lens focuses on a point source, the image is very close to a point (ignoring lens aberrations). As the plane of focus moves away from the point source, the image expands from a point to fill a circular disc. This disc is also called the circle of confusion.

Figure 4:
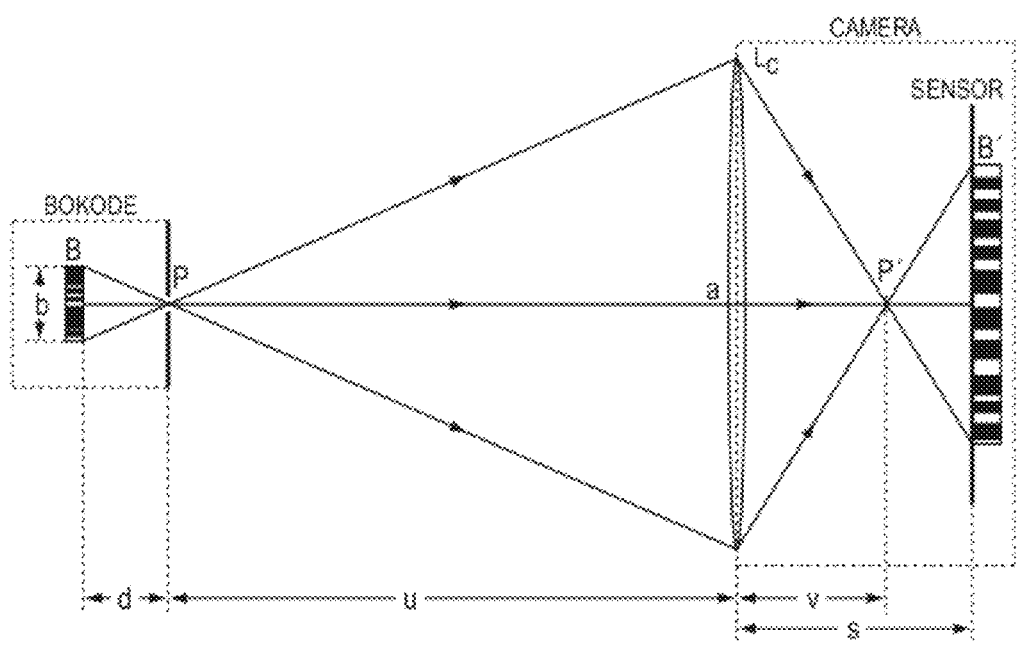
FIG. 4 is a schematic of an implementation of this invention, with a pinhole-based setup.

FIG. 4 illustrates a pinhole-based implementation of this invention, in which magnification is not affected by the distance of the camera from the pinhole. A pinhole placed in front of a barcode pattern encodes directional rays with the pattern. The camera captures this information by positioning the sensor out of focus. An unbounded amount of magnification may be achieved by increasing sensor-lens distance.

The pinhole-based implementation in FIG. 4 is a simple example of bokeh based capture of directionally or angularly varying rays. Note that in FIG. 4, light rays from different points of the bokode pattern emerge from the pinhole in different directions, i.e., the rays are directionally varying. Thus, the binary data encoded in the spatial domain in the bokode pattern becomes angularly encoded.

Different optical patterns may be used for a bokode pattern. However, in FIG. 4, the bokode pattern 40 takes the form of a barcode. FIG. 4 shows the bokode pattern's viewable size b, the aperture size a, the bokode pattern to pinhole distance d and the pinhole to camera distance u. From FIG. 4, the size of the visible bokode pattern is given by $$b=ad/u. \quad (1)$$

Based on this equation, for a typical camera with an aperture size of 25 mm, distance between the bokode pattern and the pinhole of 5 mm, and distance of the camera lens from the pinhole of 5 m, the size of the viewable bokode pattern is approximately 25 µm. In this example, the size of the viewable bokode pattern, being only about 25 µm long, is much smaller than a traditional barcode.

Next, consider the magnification achieved at the image sensor to observe this tiny code. The lens images the pinhole P to a point P' at a distance v from the lens. According to the thin lens equation, we have $$\frac{1}{f_c} = \frac{1}{u} + \frac{1}{v}, \quad (2)$$

where $f_c$ is the focal length of the camera lens. Assuming that the pinhole P is infinitely small, the size of the image at a distance v from the lens is also infinitely small.

However, as we place the sensor out of focus at a distance s from the lens, we get a highly magnified image of the bokode pattern. The viewable part of the bokode pattern produces an image of size $$b' = (v-s)a/v. \quad (3)$$

In the pinhole model, the magnification properties are easy to understand from the ray diagram, even without Equation 3. As seen in FIG. 4, the bokode pattern image can be made arbitrarily large by simply moving the lens more out of focus and increasing s. Additionally, a larger lens aperture gives larger magnification.

In this optical setup of this implementation, the information of the bokode is embedded in the angular and not in the spatial dimension. By throwing the camera out of focus, this angular information is captured (in the spatial domain) in the defocus blur formed on the sensor. The pinhole is blurred, but the information encoded in the bokeh is sharp.

However, the pinhole setup described above is not desirable due to limited light efficiency and diffraction.

To overcome these problems of light inefficiency and diffraction, the pinhole may be replaced with a small lenslet positioned at a distance equal to its focal length ($f_b$) away from the bokode pattern.

Figure 5:
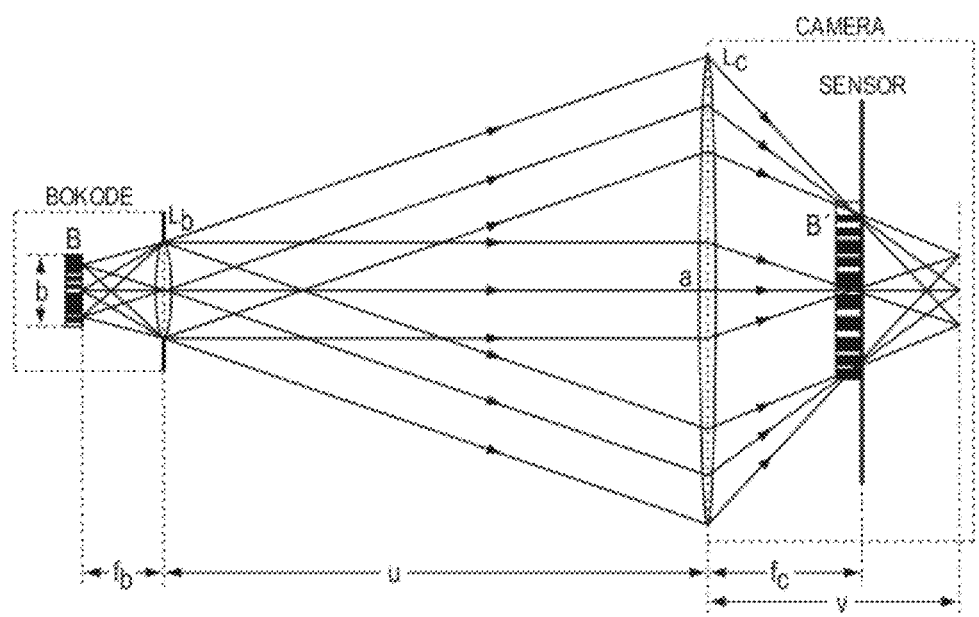
FIG. 5 is a schematic of an implementation of this invention, with a lenslet-based setup.

An example of such a lenslet-based implementation is shown in FIG. 5. In FIG. 5, the bokode pattern is in the form of a barcode.

In FIG. 5, a small lenslet is placed a focal length away from the bokode pattern. This creates multiple directional beams (ray bundles) for each position in the bokode pattern. The camera lens, focused at infinity images a magnified version of the bokode pattern on the sensor.

In FIG. 5, the lenslet collimates the rays coming from a point on the bokode pattern to form a beam or parallel ray bundle. Parallel rays for each point means the virtual image of the barcode is at infinity. As shown in FIG. 5, the camera focuses at infinity by positioning the camera lens at a distance equal to its focal length $f_c$ from the sensor, and forms an image of the bokode pattern on the sensor.

In FIG. 5, the bokode pattern produces an image with a size $$b' = (v-f_c)a/v = f_c a/u. \quad (4)$$

Finally, substituting $d = f_b$ and using Equations 1 and 4, the magnification achieved by this lenslet-based approach is given by $$M_b = f_c/f_b. \quad (5)$$

Note that, although FIGS. 3, 4, 5 and 11 are depicted in 2D for simplicity, they extend to the real 3D world.

For example, this invention may be implemented in a typical setup, where the bokode lenslet has a focal length of 5 mm, and the camera lens has a focal length of 50 mm. This results in an effective magnification factor of around $M_b \approx 10$. In other words, in this setup, the magnification is more than 1000 times larger than the $M_t \approx 0.01$ obtained in the example of a traditional barcode, discussed above. Furthermore, for a typical viewable bokode pattern size of b=25 μm (obtained above), the bokode pattern image size is b'=250 μm, which implies a coverage of about 50-150 pixels on the image sensor (depending on the sensor pixel size). This also means, in such a typical setup, that about 1000 times more bits may be packed in both dimensions, i.e., a million times more data. Equation 1 reminds us that if we reduce lenslet-camera lens distance u, i.e. by moving the camera nearer the lenslet, more of this information may be recovered.

The optics of this lenslet-based setup is similar in some ways to that of an infinity corrected microscope. The bokode lenslet is similar to the microscope's objective, and the camera lens is similar to the microscope's eyepiece. Of course, this invention and a traditional microscope differ in many ways. Among other things: Unlike a traditional microscope, in which the objective and eyepiece are connected by a tube, the bokode lenslet and the camera lens are not connected. Rather, they are separate and may move independently of each other. This ability to move independently facilitates many applications, such as the automobile, augmented reality and ubiquitous computing applications discussed below. Also, unlike a traditional microscope, the bokode lenslet and camera lens are not carefully aligned parallel lenses. Also, unlike a traditional microscope, bokodes may encode binary data in such a way that a single photograph by an out-of-focus camera enables the identity of the bokode and the camera's pose (in six degrees of freedom) relative to the bokode to be determined. Also, unlike a traditional microscope, multiple bokodes in a single scene can be imaged by a single camera. That would be as if multiple microscopes shared a single eyepiece.

A bokode lenslet setup may be implemented in such a way that it has numerous advantages compared to a traditional barcode.

One advantage is that the camera's focus may be independent of the bokode-lenslet distance. This invention may be implemented so that, in order to image the bokode pattern, the camera focuses at infinity. This focus is independent of the bokode-camera distance. This is a significant advantage over a traditional barcode where cameras require re-focusing when the depth changes Another advantage is that the bokode may be so tiny as to be almost imperceptible to a human viewer. When the scene is in sharp focus, the bokode (3 mm diameter in an example above), may occupy very few pixels in the image and not intrude into the rest of the scene.

Another advantage is that is that the magnification achieved may be independent of the lenslet-camera distance, thereby making the image easier to decode.

In order to understand other advantages, keep in mind that in many setups, only a portion of the bokode pattern is visible, and not all of the bokode pattern is viewable. Note that in Equation 1 above, b is the size of the portion of the bokode pattern that is viewable, rather than the size of the entire bokode pattern.

According to Equation 1, the size of viewable bokode pattern is proportional to the camera aperture size. A relatively large lens aperture is required to see a reasonable part of the bokode pattern. This explains why the bokode pattern may be almost imperceptible to the human eye, which has a relatively small pupil size of 2 mm to 6 mm.

Also, according to Equation 1 above, the size of viewable barcode pattern is inversely proportional to the camera-bokode distance. Hence, this invention may be implemented in such a way that a human eye or small aperture camera can view the entire, larger bokode pattern by holding it up close.

Advantageously, the distance-dependent viewing region may be used to encode hierarchical information into bokodes so that cameras recover more viewable bits as they get closer.

This invention may be implemented so that the camera views a different part of a bokode pattern depending on its position relative to the bokode. The viewable region of the bokode pattern is a function of the angle formed between the camera and the bokode lenslet's optical axis.

Unlike a traditional barcode, bokodes may be implemented in such a way that they give different information to cameras in different directions. This property of a bokode may be used for estimating six-degrees-of-freedom camera pose in augmented reality (AR) applications.

Unlike a traditional barcode, this invention may be implemented in such a way that the camera only images a small region of the entire bokode pattern at a time. This visible bokode region depends on the distance of the camera from the bokode and the relative view angle.

The bokode pattern may consist of an array of tiled data matrices such that at least one tile is always imaged by the camera within the working angle and distance range. Instead of simply repeating the same information in each data matrix, the data bits may be varied across the tiles so that the camera obtains view dependent information, something not possible with traditional barcodes.

The tiled data matrices may be comprised of a two dimensional optical pattern that uses a matrix of binary cells to store information, in accordance with the ISO specification for Data Matrices ISO/IEC16022:2006.

Figure 6:
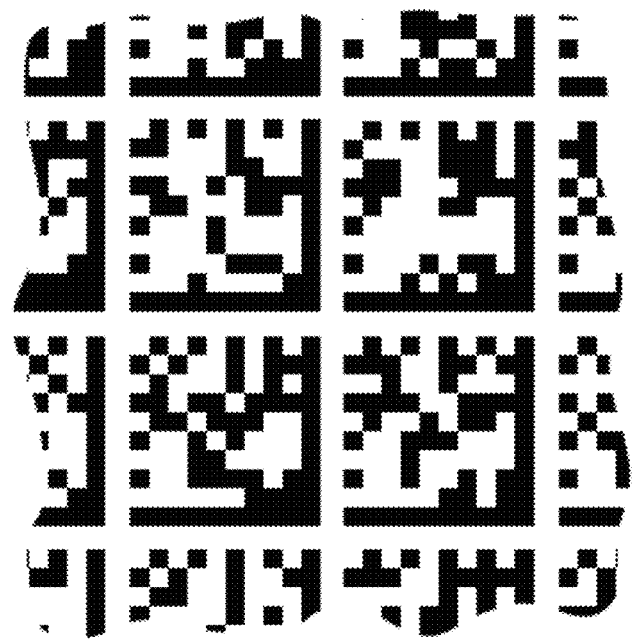
FIG. 6 shows an example of a tiled data matrix codes that may be used as printed binary codes, according to the principles of this invention.

FIG. 6 illustrates an example of a bokode pattern, comprised of a tiled array of 10×10 data matrix codes with one row/column of silent cells between adjacent codes. The 10×10 data matrix codes encode 3 bytes of data, and another 5 bytes of Reed-Solomon error correcting code. This error correcting code may ensure data integrity when a portion of the bokode is damaged. Also, the redundancy created by the Reed-Solomon error correcting code may be used to decode overlapping bokode patterns, as discussed below.

As noted above, this invention may be implemented so that the portion of the bokode pattern that is visible depends on the camera angle. This angle-dependent viewing may be exploited to facilitate angle estimation, by encoding different types of data in each data matrix tile. For example, this invention may be implemented with three independent bytes of information (in addition to 5 bytes of Reed-Solomon error correcting code). These three bytes may be allocated to the data matrix tiles as follows: one byte in each tile for the x position of that tile in the pattern, one byte in each tile for the y position of that tile, and one byte that is the same in all tiles of a particular bokode and identifies that bokode. This allows the camera to directly read out, from the captured photo, the relative position of the viewable data matrix code in addition to the bokode ID. A camera that images a data matrix tile with a position code (x, y) has an angle relative to the bokode given by the azimuth, $\phi=\arctan((y-y_0)/(x-x_0))$, and the zenith, $\theta=\arctan((\sqrt{(x-x_0)^2+(y-y_0)^2}\cdot\delta)/f_b)$, where $(x_0, y_0)$ is the tile corresponding to the zenith ($\phi=0$), $\phi=0$ is the focal length of the lenslet, and $\delta$ is the physical size of a single tile including the silent space. Additionally, the displacement of each visible data matrix tile from the center of the bokeh circle gives a better estimate of the angular position of the camera using code interpolation. The fractional position $(x_f, y_f)$ of the center of the bokeh circle $(p_c)$ may be calculated using the coordinates of four corners of a data matrix tile $p_n$ (n=0 ... 3), $$\begin{pmatrix} x_f \\ y_f \end{pmatrix} = (v_x\ v_y)^{-1}v_d + \begin{pmatrix} x \\ y \end{pmatrix}, \quad (6)$$

where $v_x=p_1-p_0$, $v_y=p_0-p_3$ and $v_d=p_c-(p_0+p_1+p_2+p_3)/4$. The average of the fractional codes is used if multiple data matrix tiles of a single bokode are observed.

Thus, this invention may be implemented so that the camera directly reads out coordinates of the tiles, thereby enabling the angular information for a bokode to be easily computed. This opens up a wide range of augmented reality (AR) and motion capture applications that rely on accurate angle estimation. Additionally, it allows a bokode to have reader position dependent information.

The depth of the bokode (i.e., the distance from the camera to the bokode lenslet) may be estimated from the size of the circle of confusion that the bokode produces on the sensor (see Equation 4, above). Like other depth from defocus systems, the depth resolution falls off inversely with distance.

It is desirable, for many applications, to use tiled data matrix codes with three bytes of information allocated to identity and the (x, y) coordinates of a tile, as discussed above. However, this invention may be implemented with other binary optical patterns. Which pattern is best depends on the particular application.

For example, for applications that only need identification and no angular information, the same data matrix code may be repeated across the pattern, thus giving three bytes for identification.

Figure 7:
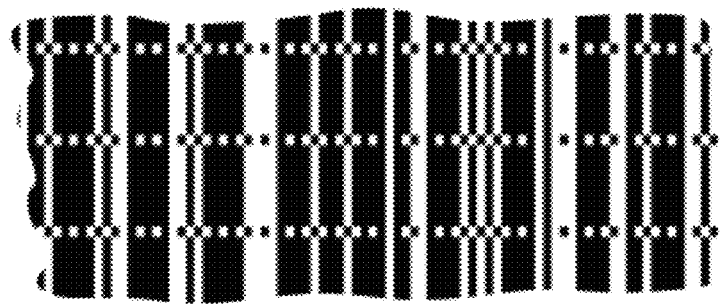
FIG. 7 shows an example of de Bruijn codes that may be used as printed binary codes, according to the principles of this invention.

Or, for example, de Bruijn codes may be used to estimate camera pose. This invention may be implemented with a bokode pattern that encodes a binary de Bruijn sequence. Highly accurate angle information may be read from such a pattern. A de Bruijn sequence B(l, k) is a sequence with a symbol size l(l=2 in the case of binary bits), for which every possible contiguous subsequence of length k or more appears exactly once. If k or more bits are visible in a bokode pattern, the camera's angle may be accurately estimated. FIG. 7 shows a part of a bokode pattern containing a 1D de Bruijn sequence.

Or, for example, this invention may be implemented with bokode patterns comprised of QR codes or Aztec codes. The specifications for these codes are set forth in ISO/IEC 18004:2006 and ISO/IEC 24778:2008, respectively.

Or, for example, this invention may be implemented with bokode patterns that are not comprised of rectangular elements. For example, a bokode may be implemented with a circular optical pattern that is indicative of binary data.

This invention may be implemented with an active bokode—i.e., the bokode/lenslet unit provides its own illumination for the bokode—or passive bokode—i.e., the bokode/lenslet unit is passively illuminated by an external illumination source, such as a flash from a camera.

FIG. 2 shows an exploded view of an example of an active bokode. In FIG. 2, a plano-convex lens with a 3 mm diameter and 8 mm focal length is used as the bokode lenslet, and a battery powered LED is used for backlight. A bokode pattern with a pixel size of 15 µm is printed on a transparency. The acrylic housing ensures that the distance between the lenslet and the pattern is equal to the lenslet's focal length (8 mm). In other implementations of this invention, much smaller pixel sizes are achieved.

Figure 8B:
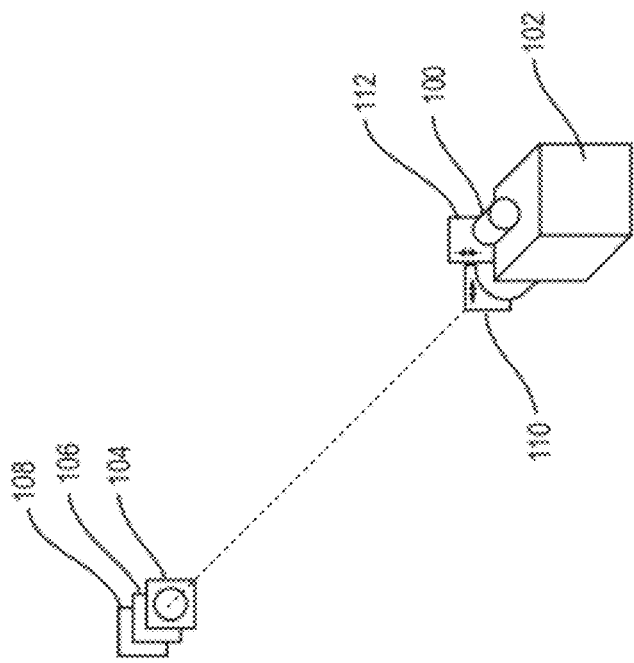
FIG. 8B is a schematic of an implementation of this invention, with a cross-polarizer arrangement for illumination.
Figure 8A:
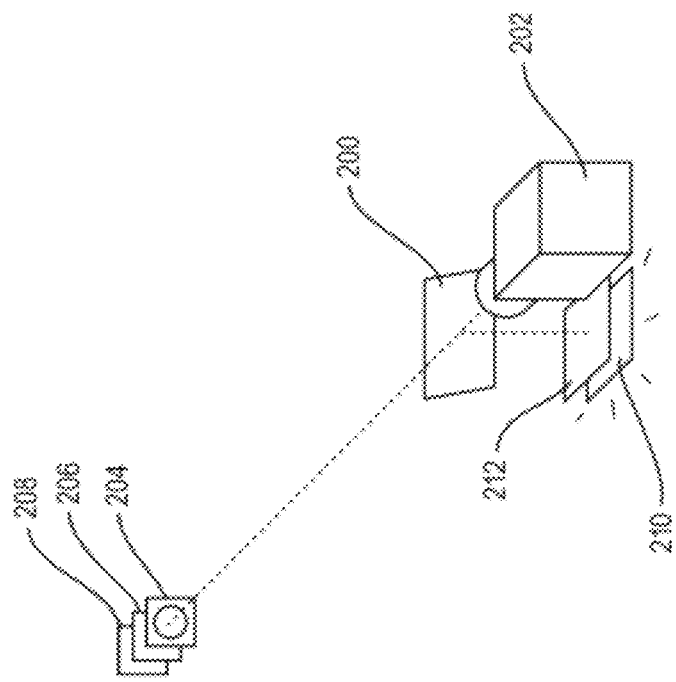
FIG. 8A is a schematic of an implementation of this invention, with a beamsplitter arrangement for illumination.

FIG. 8A and FIG. 8B show two examples of passive bokodes. In both, the LED is replaced with a retroreflector—i.e., a reflective layer behind the bokode pattern.

In FIG. 8B, a flash 100 mounted on the camera 102 illuminates the bokode pattern 104 behind the lenslet 106, and the retroreflector 108 reflects the light back towards the camera lens. A horizontal polarizer 110 is placed in front of the camera lens, and a vertical polarizer 112 is placed in front of the flash such that their polarization direction is perpendicular to one another. This eliminates the specular reflection from the bokode lenslet and enhances the contrast of the bokode pattern.

In FIG. 8A, a beamsplitter 200 is used to position the flash at the center of projection of the camera 202. The flash illuminates the bokode pattern 206 behind the lenslet 208, and the retroreflector 210 reflects the light back towards the camera lens. The flash originates from an extended light source 210 and is diffused by a diffuser 212 before it reaches the beamsplitter 200.

Figure 9:
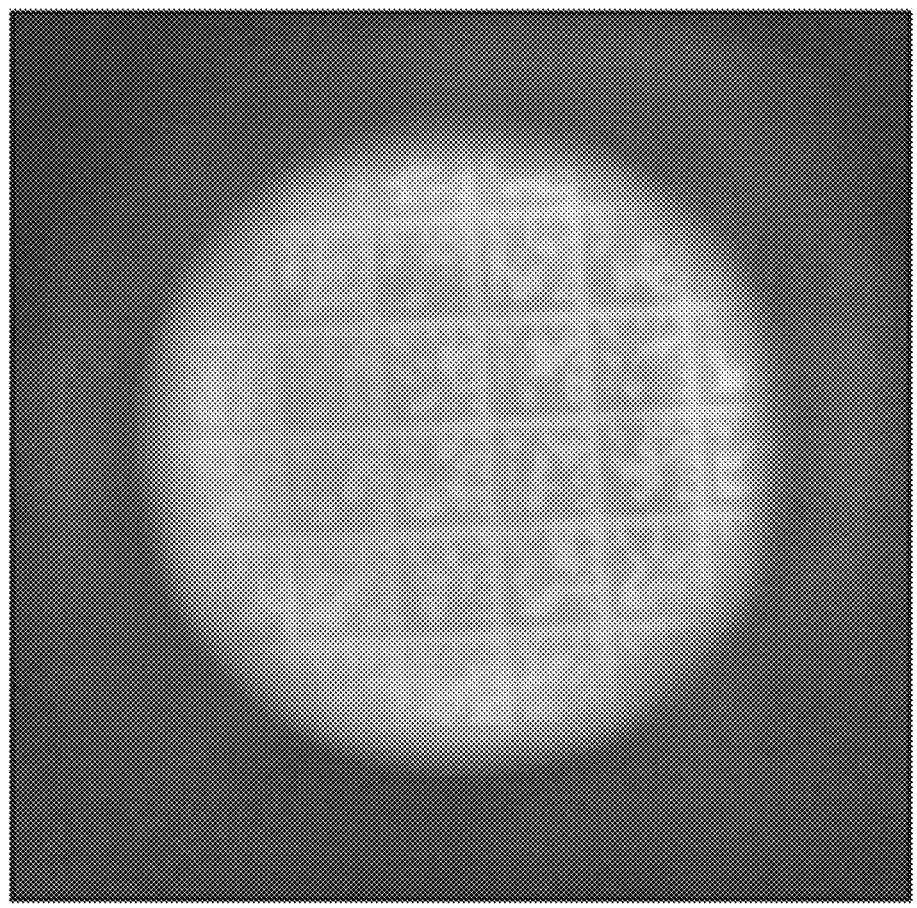
FIG. 9 is an image of a printed bokode pattern captured with a camera and a light source behind a beamsplitter.

FIG. 9 is an image of a printed bokode pattern captured with a camera and a light source behind a beamsplitter.

This invention may be implemented with a variety of different cameras. For example, the consumer cameras, Canon® Digital Rebel XSi and the Canon® 5D II may be used with reasonably large aperture lenses, EF 85 mm f/1.8 and the EF 50 mm f/11.8. In this example, the lenses may be used at their largest aperture setting, and manually focused to infinity.

This invention may be used for augmented reality (AR) applications. For example, this invention can be implemented for an AR application by capturing two photos nearly simultaneously. One photo is focused at infinity and captures the bokode information. The second photo is focused at the scene and captures the scene. To capture the two nearly simultaneous photos, a beamsplitter and two synchronized cameras that share the same center of projection may be used. Alternately, the two photos may be taken with a camera that changes focus from bokode distance to infinity in successive frames. Alternately, the two photos may be taken by a camera with multiple CCD (charged couple device) sensors, using an in-focus sensor to capture the in-focus photo and an out of focus sensor to capture the bokode information.

This invention is advantageous for AR applications, because bokodes may be implemented with a tiny size that occupies very few pixels in a focused photo, unlike many other AR techniques.

As noted above, this invention may be implemented so that the camera directly reads out coordinates of the tiles, thereby enabling the angular information for a bokode to be easily computed. This is unlike typical fiducial based pose estimation techniques, such as ARToolKit, which estimate the angle based on changes in the shape of the fiducial tag. The changes in shape are significant when the tag is viewed from oblique angles, and provide reliable angle estimates. However, these changes are subtle when the camera is exactly overhead the fiducial tag (i.e., the line from the camera to the fiducial is perpendicular to the fiducial). Thus, in the case where the camera is exactly overhead the fiducial, a typical AR that estimates angle based on distortion may produce unstable angle estimates. However, angle estimation from a bokode may be far more robust in this case because it primarily relies on the digital information contained in the visible data matrix codes.

The fact that bokodes may have a tiny size also makes them well suited for many motion capture applications. Also, for motion capture, bokodes may be implemented in such a way that they provide identification in addition to position and orientation, and the system does not have to deal with marker swapping and marker reacquisition, even when the markers go outside the scene and come back.

A camera with a small aperture (such as a typical mobile phone camera) may see only a limited part of a bokode pattern unless it is at close range. However, it is possible to make a large part of a bokode pattern viewable by such a camera even at a large depth. This may be done by translating—i.e., moving—the camera within one exposure time with the lens focused at infinity. As a result of this translation, different parts of the bokode pattern are imaged on different parts of the sensor. Thus, this translation simulates a larger aperture in a single exposure.

Figure 10:
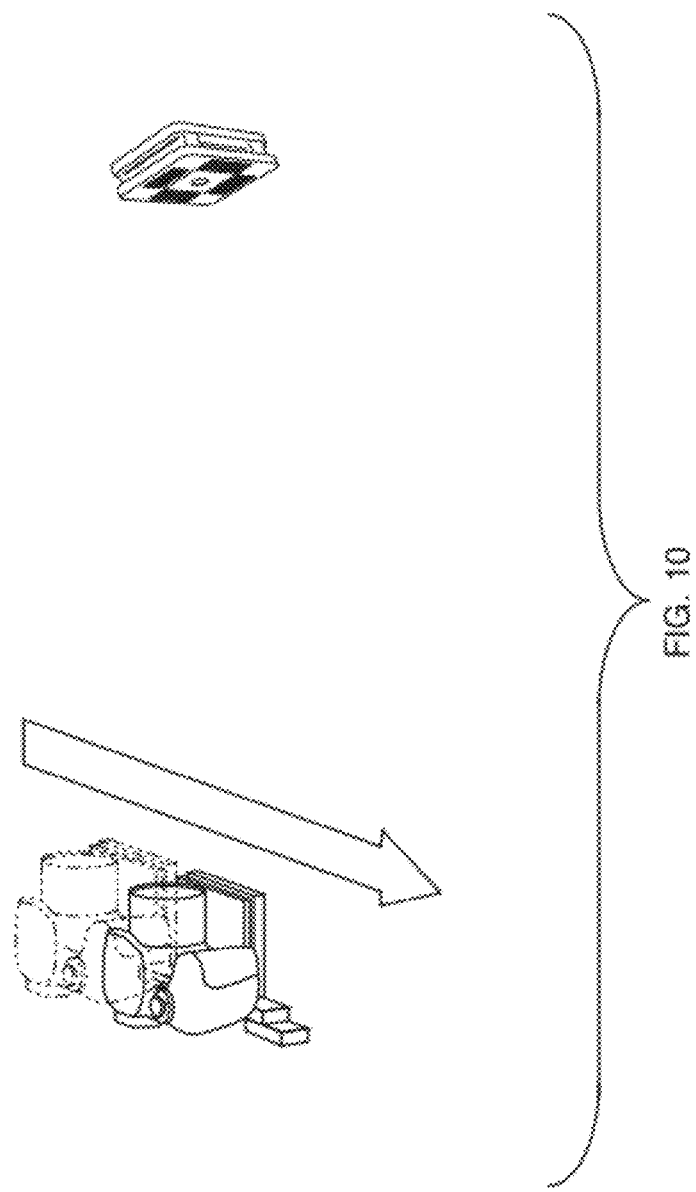
FIG. 10 is a schematic of an implementation of this invention, in which the camera is translated (moved) while imaging the printed binary code.

FIG. 10 illustrates an example of this translation technique. In FIG. 10, the camera translates perpendicular to the optical axis of the bokode lenslet during the length of the exposure. In FIG. 10, the camera has a small aperture size of f/8, the lens focuses at infinity, and the total translation is about 4 cm.

In some implementations, it is desirable to increase the resolution of the bokode pattern. For example, electron beam lithography may be used to generate bokode with high resolutions, such as a 2.5 µm feature size.

One advantage of a higher resolution pattern is that it increases the maximum distance between the camera and bokode lenslet. In one example with a typical camera and a bokode pattern with a 15 µm pattern feature size, the maximum distance at which an entire data matrix tile is viewable is around 2 m. Reducing the pattern feature size from 15 µm to 5 µm increases this distance to 6 m while still remaining within the diffraction limit.

Another advantage is that a higher resolution bokode pattern permits the use of smaller aperture cameras. This is because the size of the visible region of the bokode pattern depends on the camera's aperture size.

Figure 11:
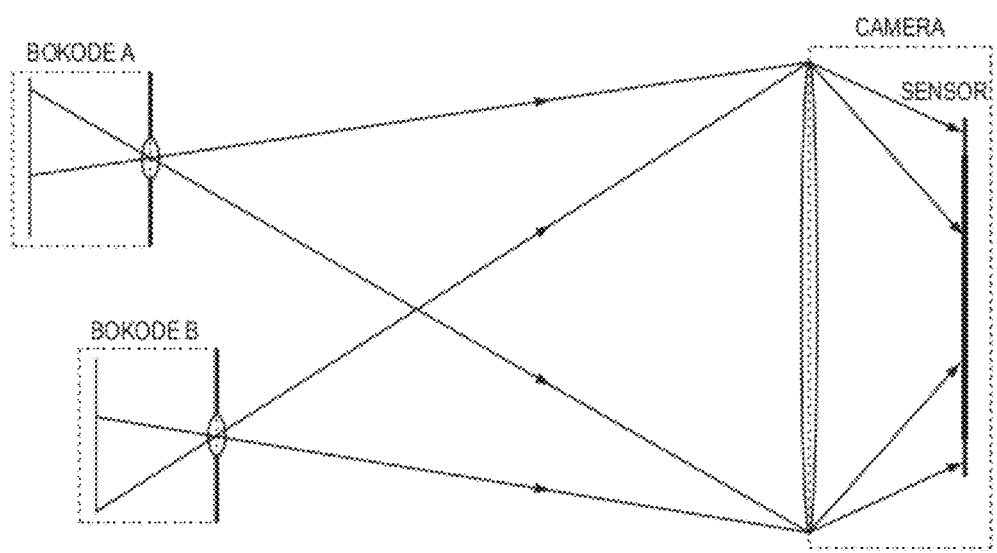
FIG. 11 is a schematic of an implementation of this invention, in which images from more than one printed binary code overlap.

FIG. 11 shows a diagram in which multiple bokode patterns overlap on the sensor. However, this invention may be implemented so that even if images overlap, the images may be decoded. For example, redundancy created by the tiling of data matrix tiles and error correction offered by Reed Solomon coding may permit overlapping bokode images to be decoded.

Figure 12:
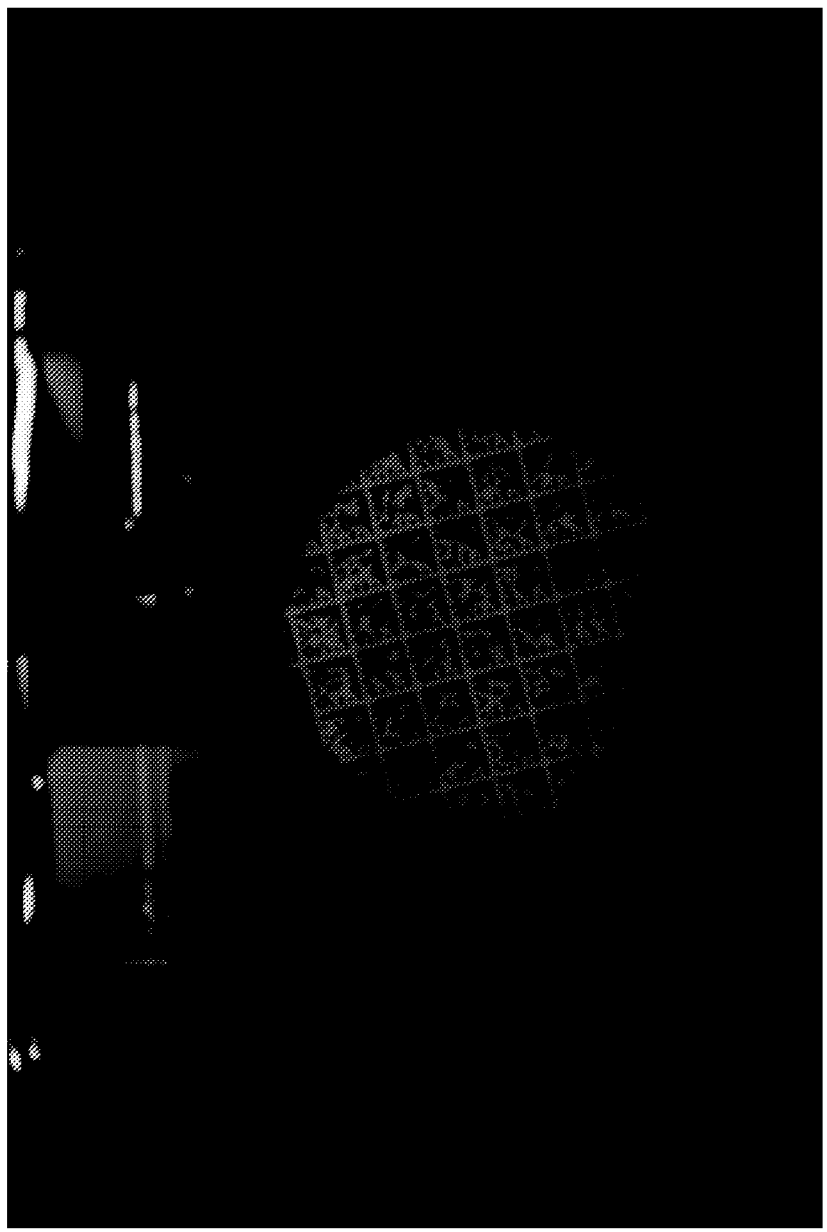
FIG. 12 is an image of a bokode pattern captured by a standard out-of-focus camera "focused at infinity", in an exemplary implementation of this invention.

FIG. 12 is an image of a bokode pattern captured by a standard out-of-focus camera "focused at infinity", in an exemplary implementation of this invention.

This invention may be implemented for use as an identifier barcode. It has many advantages compared to a traditional barcode. A traditional barcode must be viewed at a close distance, does not have information that can vary depending on the direction in which it is viewed, and is not able to provide more information as the distance to the barcode reader decreases. In contrast, in an exemplary implementation of this invention, a bokode may be viewed from afar (2 m-3 m) with a standard camera. In such implementation, a bokode has information that is directionally varying, so that it can send different information to cameras in different directions. In such implementation, the size of the viewable bokode pattern increases as the camera comes closer, so that a reader may learn more information from the bokode as the reader moves closer. For a camera with a small aperture, a large part of the bokode pattern is viewable when the camera is held right next to the bokode lenslet. This allows more information to be packed into a smaller physical region when a bokode is used at close range.

This invention may facilitate user interaction with displays from a distance.

The following is a description of an exemplary implementation of this invention, which facilitates such user interaction: The scenario above—in which a human holds a camera that images bokodes on objects—is inverted. Instead, humans hold or wear bokodes, and cameras or bokode readers look at the bokodes from a distance. The cameras observe multiple bokodes at the same time, thus allowing multi-user interaction. The setup consists of (1) a static or dynamic display such as a screen or a billboard, which can be large so that multiple people can view it at the same time, (2) a capture device, which may be a camera focused at infinity or a bokode reader (i.e., an imaging device dedicated to imaging bokodes), (3) a computer or processor connected to the camera to process the images it captures and provide feedback, and (4) bokodes that people carry or wear, for example on their keychain, to interact with the display. The capture device captures the image of each bokode, and a processor decodes the image. Since each bokode has a unique identity, the system knows the identity of each person interacting with it. Additionally, since the system can estimate the relative position of each user, it knows where each user is pointing her bokode. This allows multiple users to interact with the display from a distance.

In this exemplary implementation, the capture device may be embodied in a variety of ways. For example, the capture device may be (a) an array of individual cameras, which are spread out around the large display, or (b) a strip of camera sensors which may be placed on top or below of the display device, or (c) a single camera with high frame rate and large aperture placed next to the display.

In this exemplary implementation, bokodes may be carried or worn by human users or affixed to the users' clothing. For example, (a) a single bokode may be embedded in a cellphone camera, (b) a single bokode may be placed at the tip of a pen or a keychain to simulate a pointing device, and (c) multiple bokodes may be placed in a hemispherical pattern to increase the effective view angle.

Since this exemplary implementation facilitates user interaction with a display at a distance, it has a wide range of applications. These applications include: (a) crowd gaming with large displays in public spaces, (b) multiple students interacting with displays in a classroom, (b) interactive whiteboards in meetings, (d) jukebox control from a distance in a bar, and (d) interactive advertising.

More generally, a bokode may be implemented in such a manner that a human wears or carries at least one bokode, and cameras or readers for imaging these bokodes are placed in the human's environment, enabling the environment to respond to the human.

Advantageously, this invention may be implemented with bokodes affixed to automobiles or other vehicles.

Some background on situational awareness in automobiles: Situational awareness allows drivers to anticipate and defensively react to the activity on the road. Sensors have been added to cars to give a car itself situational awareness and either inform the driver of hazards or allow the car to react by itself in limited ways. Often these cases are limited to the drivability and control of the car itself, such as ABS (anti-lock braking system), dynamic stability control, or suspension control. Some newer systems are providing the ability to detect and react to both other automobiles and pedestrians, but they rely on costly and bulky millimeter radar and camera combination and are limited to high-end vehicles.

This invention may be implemented as an automotive bokode, used as an alternative or in conjunction with other automotive sensors, to not only determine the location and heading of other vehicles and pedestrians, but also provide other useful information unobtainable from other sensors. These bokodes provide the automobile with a greater situational awareness to anticipate and defensively react to driving conditions.

For example, a bokode may be implemented in an extra brake light for an automobile, as follows: Drivers of trailing cars see only an ordinary brake light and are thus not distracted, but their cars use on-board cameras to detect and decode the bokode pattern. A processor onboard a trailing car estimates the distance and the rate of closure to the braking car. The bokode also carries angular information; so the processor also determines which direction the braking car is heading. Based on such calculations of distance, closing rate, and direction of travel of the braking car, the processor may output instructions, such as to give a warning to the driver of the trailing car that a collision is imminent, or triggering semi-automatic braking or steering to avoid collision with the braking car. The bokode is illuminated only when the brake lights are on, thus reducing the amount of information trailing cars needed to process, limited only to those cars that they are most likely to collide with.

Bokodes can be used on automobiles in other ways. For example, bokodes can be added to headlights and other driving lights. Alternately, active or passive bokode modules may be mounted on automobiles separate from existing lights. Multiple cameras imaging the entire road space around the car can scan for other automobile's bokodes to detect, warn, and react to potential side, rear, and head-on collisions.

Bokodes on automobiles are not limited to position and orientation information. A bokode is capable of carrying any type of information. In the case of automotive applications, bokodes can encode information regarding the type of vehicle, for instance, school busses, delivery trucks, or other vehicles that stop often; hazardous material vans, fuel trucks, or wide load trailers. Bokodes can encode information about the condition or type of driver, such as elderly or learning drivers. A bokode used in this manner may carry no personalized identification, to mitigate privacy concerns.

Bokodes are not limited to tagging automobiles, but could be applied to anything common in the driving environment. For example, cyclists and pedestrians can also wear either passive or active bokodes, thus giving automobiles awareness of the type and movement of other road occupants. Road signs and signals may have bokodes that allow automobiles to receive information about road or traffic conditions; such as stop lights, train crossings, and construction. These may be either static semi-active signals, or may be dynamically updated. Thus, for example, traffic billboards with bokodes can not only inform the driver but also the driver's car of changing conditions.

Bokodes have many other applications. A few examples follow:

Bokodes may be affixed to the outside of stores and other commercial establishments on a street. A vehicle drives down the street, taking photographs of the stores on the street for mapping purposes. The vehicle carries in-focus cameras for photographing the scenes on each side of the street. It also carries out-of-focus cameras for capturing the information from bokodes in the scene on each side of the street, using the translation technique described above. The bokodes contain detailed information about the stores or other establishments to which they are affixed.

Bokodes may be affixed to street billboards, in such a manner that the human eye sees the billboard information but an out of focus camera captures the data matrix indicating a website link.

A bokode pattern may be dynamically altered. A changing bokode pattern may be displayed by, for example, by an LCD (liquid crystal display). Dynamic bokodes and cameras embedded in cell phones can be used for high speed near-field optical communication.

Bokodes may be used with surface computing interfaces. For example, a surface computing interface may be comprised of a table's surface. A camera focused at infinity can capture the information contained in tiny bokodes attached under physical objects placed on the table surface. The system decodes position, identification, and the angle that such an object (such as a stylus pen) makes with the surface.

Bokodes may be used as computational probes in computational photography, and as tools for camera calibration.

This invention may be implemented in such a way that, after an image of a bokode pattern is captured by a light-sensing device, an output device outputs a signal indicative of the captured image for transmission to at least one digital processor. The output device may be included within the light-sensing device. At least one processor may process the signal in such a way as to decode at least some of the binary data encoded in the bokeh image. In addition, the processor may make other calculations, such as determining (a) distance from the camera to the bokode lenslet, (b) the camera's angle relative to the bokode, and (c) the bokode's identification. In addition, the processor may decode error correction codes. For example, such error correction may be used to compensate for overlapping bokode images or damaged bokodes. In addition, the processor may make other calculations, such as determine (a) the relative direction of movement of an object on which a bokode is mounted, and (b) the rate of closure between such object and an object on which a camera is mounted. In addition, the processor may make further computations necessary for the applications discussed herein. The processor may generate instructions for altering audio or visual output of transducers, which output is perceptible to humans. For example, the processor may generate instructions for altering the display of a screen in response to bokodes carried by one or more human users. The processor may be onboard the camera or other light-sensing device. Alternately, the processor may not be onboard. These processing functions, including these calculations, may be performed by one or more processors.

This invention may be implemented in many different ways, in addition to those described above. Among other things:

This invention may be implemented using an origami lens or a Fresnel lens to collimate light from a bokode pattern. These types of lenses may be desirable in some applications because of their thinness.

In a passive bokode design, fluorescent reflectors may be coupled with a UV camera flash.

A bokode need not be illuminated from behind, such as by a backlight or retroreflector. Instead, for example, the bokode pattern may itself be part of a mirror that reflects light, such as a flash, from in front of the mirror.

Bokodes may be combined with existing planar fiducial based AR tags. The combination may be used to provide reliable angular estimates for a wide range of angles, even in cases where the bokode itself has a limited angular range.

Bokodes may be advantageously combined with RFID (radio frequency identification). Typically, RFID is used to determine the presence of an object within a certain range, but not the object's direction. In a bokode/RFID combination, once an RFID is detected, a camera may be used to gather detailed information, including distance, angle and identity, from a bokode. The detection of an RFID may trigger an active bokode unit to illuminate the bokode pattern, or may trigger a flash to illuminate a passive bokode unit, or may trigger an RFID to power an active bokode unit.

Some definitions: The term "lenslet" refers to a small lens. A "lenslet" need not be part of an array. A "tile" may be of any shape, whether or not rectangular. "Tiles" in the same "tiled pattern" may differ in size and orientation from each other.

Conclusion

It is to be understood that the methods and apparatus which have been described above are merely illustrative applications of the principles of the invention. Numerous modifications may be made by those skilled in the art without departing from the scope of the invention. The scope of this invention is limited only by the claims that follow.

What is claimed is:

1. A system comprising, in combination:
an artificial light source for illuminating an optical pattern, which pattern encodes binary data;
the pattern; and
apparatus adapted for altering the direction of light rays from the pattern in such a way that
the light rays travel to a camera and pass through a lens of the camera, and
a focused image of at least a part of the pattern is captured by the camera at a time that the camera is focused at a depth other than the depth of the apparatus;
wherein the system is separate from and not part of a unified structure with the camera.

2. The system of claim 1, wherein the binary data includes information from which an angle of the camera relative to the apparatus may be determined.

3. A system comprising, in combination:
an optical pattern that encodes binary data; and
apparatus adapted for altering the direction of light rays from the pattern in such a way that
the light rays travel to a camera and pass through a lens of the camera, and
a focused image of at least a part of the pattern is captured by the camera while the camera is focused at a depth other than the depth of the apparatus;
wherein the apparatus does not comprise a lenticular lens, and wherein the system is separate from and not part of a unified structure with the camera.

4. The system of claim 3, wherein the apparatus is configured for collimating light from the apparatus in such a way that the light travels to the camera for imaging of at least part of the optical pattern while the camera is focused at infinity.

5. The system of claim 3, wherein the optical pattern comprises binary variations of optical appearance in two spatial dimensions, respectively.

6. The system of claim 3, wherein: the lens comprises a spherical lens; at least some of the binary data is arranged in a set of subpatterns; each of the subpatterns in the set is unique within the pattern; and which subpatterns are visible to the camera depends on angle of view.

7. The system of claim 3, wherein the binary data includes information for error correction.

8. The system of claim 3, wherein at least a portion of the binary data indicates a spatial position of the portion relative to the pattern.

9. The system of claim 3, wherein the optical pattern comprises a tiled pattern, and each particular tile in the tiled pattern, respectively, encodes spatial coordinates of the particular tile relative to the tiled pattern.

10. The system of claim 3, wherein:
the optical pattern that encodes the binary data has a total spatial area and
the apparatus is configured so that the camera may view a portion of the total spatial area and part of the binary data, and so that the portion of the total spatial area and the part of the binary data that is visible to the camera varies inversely with the distance between the camera and the apparatus.

11. The system of claim 3, further comprising the camera.

12. The system of claim 3, wherein the optical pattern is backlit at the time the camera images the pattern.

13. The system of claim 3, further comprising at least one radio frequency identification tag that is directly or indirectly affixed, or adapted to be directly or indirectly affixed, to the apparatus.

14. The system of claim 3, wherein the apparatus is affixed or adapted to be affixed to an automobile or other vehicle.

15. The system of claim 3, wherein the apparatus is adapted to display the optical pattern in such a way that the pattern changes over time.

16. Apparatus comprising, in combination:
an optical pattern that encodes binary data and
an optical system configured for altering the direction of light rays from the pattern in such a way that
the light rays travel to a camera and pass through a spherical lens of the camera, and
a focused image of at least a part of the pattern is captured by the camera while the camera is not focused at the depth of the apparatus;
wherein:
the apparatus is separate from and not part of a unified structure with the camera;
the binary data is arranged in a set of subpatterns,
each of the subpatterns in the set is unique within the optical pattern; and
a position of the camera relative to the apparatus may be determined from which of the subpatterns are visible to the camera.

17. The apparatus of claim 16, wherein the distance from the camera to the apparatus may be estimated from the size of a circle of confusion that the apparatus produces on the sensor plane.

18. The apparatus of claim 16, further comprising the camera.

19. The apparatus of claim 16, further comprising a digital processor for:
decoding bytes of the binary data, which bytes encode a position of the bytes in the optical pattern, and
based on the position, calculating a pose of the camera relative to an optical axis of the optical system.

20. The apparatus of claim 16, wherein the camera, alone or together with at least one other camera, is adapted for imaging a plurality of patterns, including the optical pattern, in or on objects worn by or affixed to a plurality of persons.

21. The apparatus of claim 16, wherein the apparatus does not include a cylindrical lens.

22. The system of claim 16, wherein the optical pattern comprises a tiled pattern, and each particular tile in the tiled pattern, respectively, encodes two dimensional spatial coordinates of the particular tile relative to the tiled pattern.

23. A method comprising using a camera to capture a focused image of a visual pattern, wherein
the pattern encodes binary data;
the pattern is two dimensional, comprising binary variations of optical appearance in two spatial dimensions, respectively;
an optical system alters the direction of light from the pattern before the light strikes the camera and passes through a lens of the camera,
the alteration of direction causes the captured image to be focused even though the camera is not focused at the depth of the pattern at the time the image is captured, and
both the pattern and the optical system are separate from, and not part of a unified structure with, the camera.

24. The method of claim 23, wherein the optical pattern comprises a tiled pattern, and each particular tile in the tiled pattern, respectively, encodes two dimensional spatial coordinates of the particular tile relative to the tiled pattern.

25. The method of claim 23, wherein:
the binary data is arranged in a set of subpatterns;
each of the subpatterns in the set is unique within the optical pattern; and
a position of the camera relative to the optical system may be determined from which of the subpatterns are visible to the camera.

26. A system comprising, in combination:
an optical pattern that encodes binary data; and
apparatus adapted for altering the direction of light rays from the pattern in such a way that
the light rays travel to a camera and pass through a lens of the camera, and
a focused image of at least a part of the pattern is captured at a sensor plane of the camera at a time that the camera is focused at infinity;
wherein the system is separate from and not part of a unified structure with the camera.

27. A system comprising, in combination:
an optical pattern that encodes binary data; and
apparatus adapted for altering the direction of light rays from the pattern in such a way that
the light rays travel to a camera and pass through a lens of the camera, and
a focused image of at least a part of the pattern is captured by the camera at a time that the camera is focused at a depth other than the depth of the apparatus;
wherein the system is separate from and not part of a unified structure with the camera.

* * * * *